United States Patent [19]

Wheeler, Jr. et al.

[11] 4,341,474
[45] Jul. 27, 1982

[54] EXTRUDER SCREW

[76] Inventors: Norton C. Wheeler, Jr., Money Point Rd., Mystic, Conn. 06355; Waseem Rahim, 85 Crouch St., Groton, Conn. 06340

[21] Appl. No.: 181,920

[22] Filed: Aug. 27, 1980

[51] Int. Cl.³ .............................................. B29B 1/06
[52] U.S. Cl. .................................... 366/88; 366/323; 425/376 R
[58] Field of Search .................... 366/88, 89, 90, 79, 366/81, 83, 84, 319, 323; 425/208, 376 R

[56] References Cited

U.S. PATENT DOCUMENTS

| Re. 28,901 | 7/1976 | Kim | 425/208 |
|---|---|---|---|
| 3,271,819 | 9/1966 | Lacher | 366/89 |
| 3,358,327 | 12/1967 | Maillefer | 18/12 |
| 3,375,549 | 4/1968 | Geyer | 366/83 |
| 3,445,890 | 5/1969 | Heston et al. | 18/12 |
| 3,650,652 | 3/1972 | Dray et al. | 425/206 |
| 3,698,541 | 10/1972 | Barr | 366/88 |
| 3,866,890 | 2/1975 | Tadmor et al. | 259/191 |
| 3,888,469 | 6/1975 | Geyer | 259/191 |
| 3,897,938 | 8/1975 | Kim | 259/191 |
| 4,000,884 | 1/1977 | Chung | 366/88 |
| 4,173,417 | 11/1979 | Kruder | 366/89 |

*Primary Examiner*—Robert W. Jenkins
*Attorney, Agent, or Firm*—Howard G. Garner

[57] ABSTRACT

An extruder screw having a root, a helical primary flight on the root and a helical barrier flight on the root and forming with the primary flight a solids channel and a melt channel. The width of the solids channel gradually decreases and the width of the melt channel gradually increases along an upstream zone of the melting section. The width of the channels gradually changes in a downstream zone of the melting section but substantially less than in the upstream zone.

7 Claims, 6 Drawing Figures

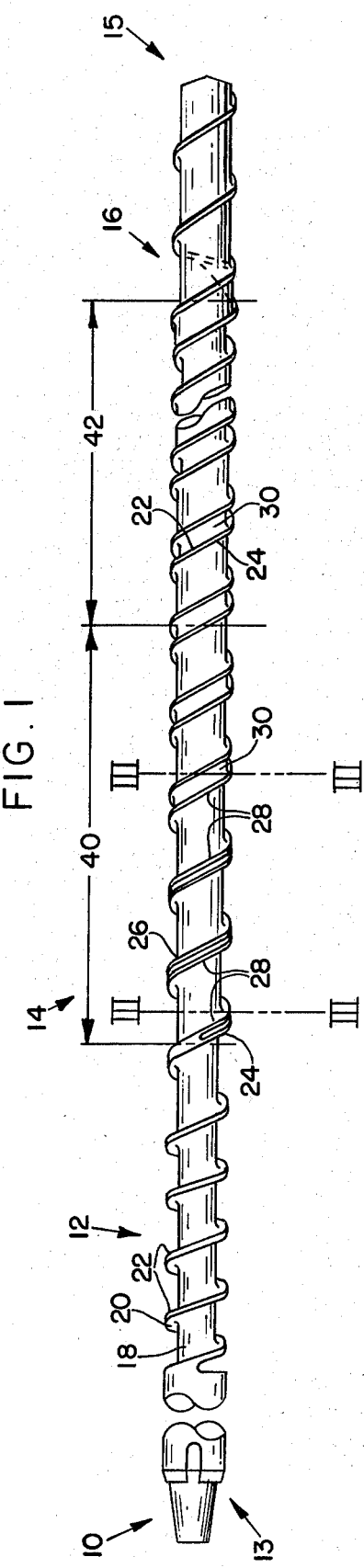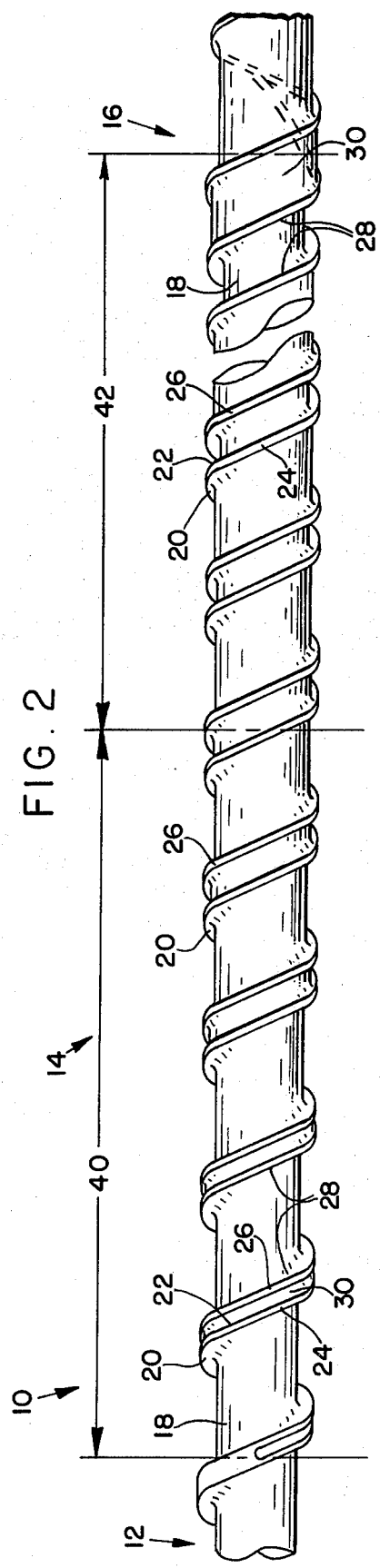
FIG. 1
FIG. 2

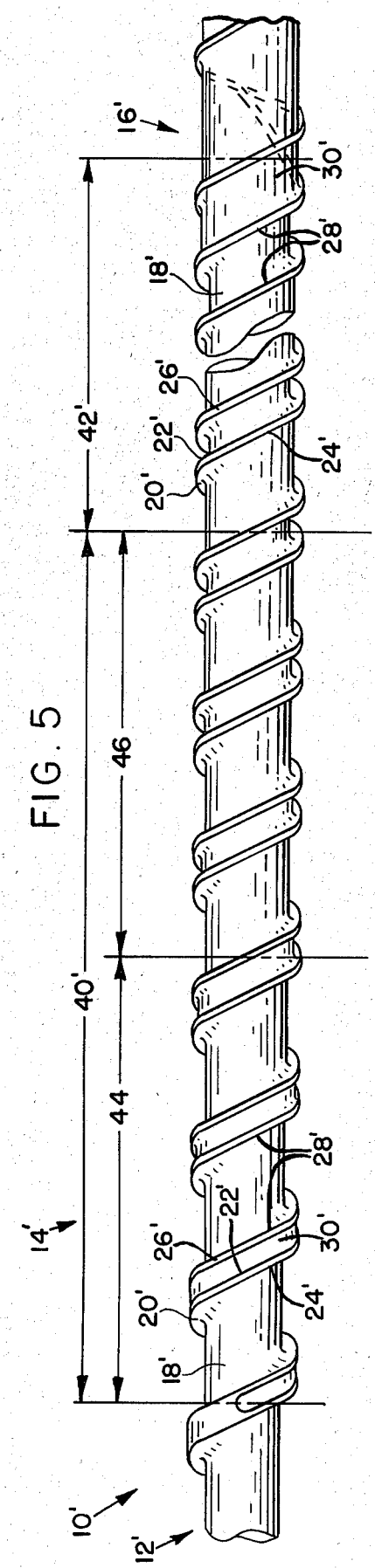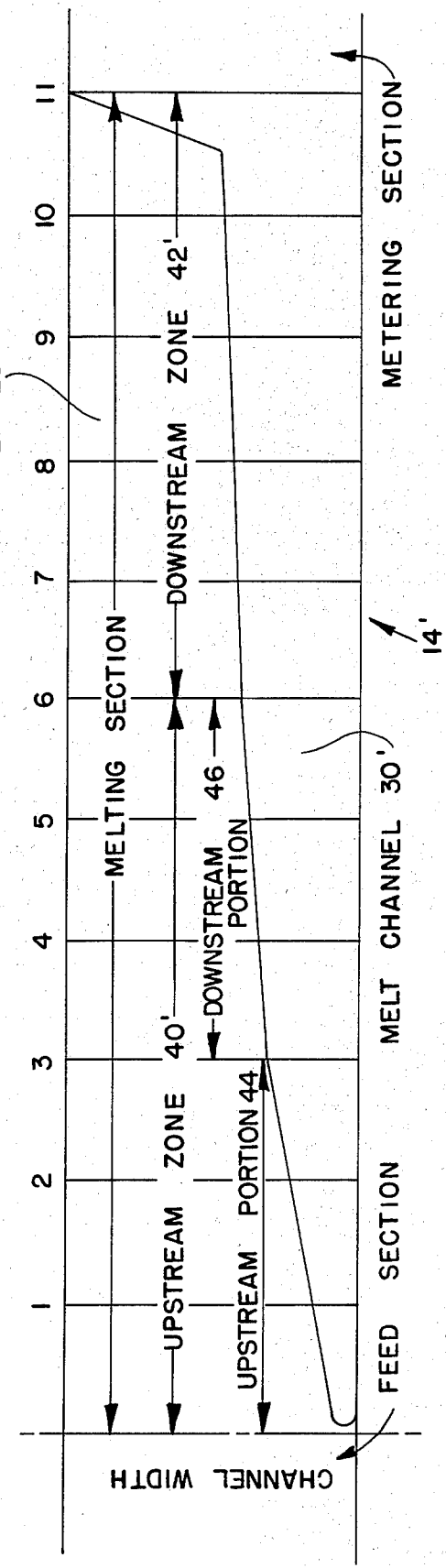

EXTRUDER SCREW

BACKGROUND OF THE INVENTION

The present invention relates to a screw for a thermoplastic extruder.

In the manufacture of thermoplastic material, the extruder receives the thermoplastic material in the form of pellets or chips in its hopper and delivers such material to the screw for processing. The screw has a feed section for advancing the solid or unmelted material at a predetermined rate, a melting section for plasticizing or working the material to turn it from a solid to a melted state, and a metering section for advancing the melted material to the discharge end of the extruder.

The conventional screw comprises a root and a single flight helically extending about the root. The flight forms with the interior cylindrical surface of the extruder barrel, a helical channel along which the thermoplastic material is conveyed. As the solid thermoplastic material enters the melting section from the feed section, the material begins to melt due to the heat created by friction within the thermoplastic material and heat from an external source conducted through the barrel itself. The melting rate depends a great deal upon the amount of contact between the barrel and the thermoplastic material in the solid state. The material in contact with the barrel begins to melt and form a melt film which adheres to the inner surface of the barrel. When the thickness of the melt film exceeds the clearance between the barrel and flight, the leading edge of the flight scrapes the melt film off the inner surface of the barrel and collects it at the forward or leading edge of the flight, forming a melt pool of the melted material. As the material continues to melt, the solid mass, normally referred to as the solids bed, eventually breaks up into clusters of floating solids in a stream of molten material. When this happens, only a small portion or none of the solid material is exposed to the barrel and heat must travel from the barrel through the molten material to the solid material. Since the thermal conductivity of thermoplastic material is very low, this is a very inefficient heat transfer condition. As a result, the melting efficiency is greatly diminished once the solids bed has broken up.

There have been many attempts to solve this problem by designing screws so that the capacity of the channel decreases toward the outlet end in an attempt to keep the solids bed intact as long as possible. However, most screw designs were unsuccessful in this attempt until the development of a screw having a primary flight and a barrier flight that defines a solids channel extending between the trailing edge of the primary flight and the barrier flight, and a melt channel extending between the leading edge of the primary flight and the barrier flight. The barrier flight has a smaller outer diameter than the primary flight. As the material in the solids channel melts, it passes over the barrier flight and is scraped off and into the melt channel, so that the solids and the melt remains separated as the thermoplastic material is conveyed along the length of the screw. However, since the ratio of the solids-to-melt gradually decreases as the material is advanced toward the exit end of the extruder, it is necessary to increase the volume of the melt channel while decreasing the volume of the solids channel.

U.S. Pat. No. 3,375,549 to Geyer issued Apr. 2, 1968 shows a barrier or double channeled screw in which the volume of the solids channel is diminished by decreasing its width and depth and the volume of the melt channel is increased by increasing its width and depth. This provides maximum exposure of the solids to the barrel at the inlet end of the screw and minimum exposure at the outlet end of the screw. The advantage of this screw is that it provides maximum exposure of the solids when it is most needed, that is, at the beginning of the melting process when there are more solids and the solids are relatively cooler. However, since the width of the solids channel diminishes to zero toward the outlet end of the screw, melting efficiency also diminishes.

U.S. Pat. No. 3,698,541 to Barr issued Oct. 17, 1972 represents an attempt to overcome the problem of diminishing melting efficiency in a "barrier" or double channeled screw. As disclosed in this patent, the width of the solids channel is initially greater than the width of the melt channel and the width is kept constant along the entire melting section by maintaining the pitch of the primary flight and barrier flight constant. Barr accommodates the changing solids-to-melt ratio by gradually decreasing the depth of the solids channel and increasing the depth of the melt channel. This relationship provides a constant area of contact between the solids and the barrel from one end of the barrel to the other. The principal disadvantage of screws of the type shown in the Barr patent is that in order to accommodate the volume of melt, as the material progresses down the screw, the melt channel has to become very deep. Since the melt channel is initially narrow, it approaches a square cross-section towards the end of the melting section. This creates a condition of poor circulation of the melt within the melt channel, resulting in possible degradation of, and thermally unstable, material. These and other difficulties experienced with the prior art screws have been obviated by the present invention.

It is, therefore, a principal object of the present invention to provide a screw of the barrier type that has maximum melting efficiency along the entire melting section of the screw.

Another object of the invention is the provision of a screw in which there is maximum solids-to-barrel contact along the entire length of the melting section of the screw.

A further object of the present invention is the provision of a screw in which the solids channel gradually changes in both width and depth while maintaining ideal width-to-depth ratios and without sacrificing melting efficiency.

It is another object of the instant invention to provide a screw in which the widths of the solids and melt channels gradually change, but at rates that vary in accordance with particular melt conditions existing in various zones in the melting section to maximize the melting efficiency of the entire melting section.

SUMMARY OF THE INVENTION

According to the present invention, the screw is divided into a feed section, a melting section, and metering section. The screw comprises a root, a helical primary flight extending about the root and a helical barrier flight extending about the root in the melting section and forming with the primary flight a solids channel and a melt channel. The width of the solids channel gradually diminishes and the width of the melt channel gradually increases in a downstream direction. The melting section is divided into at least two lengthwise zones, wherein the rate of change in the width of each channel in one zone is substantially different than the rate of change in the other zone. The rates of change in channel widths are in accordance with melting rate of the thermoplastic material in the screw.

More specifically, the melting section of the screw is divided into an upstream zone and a downstream zone. The rates at which the solids channel decreases in width and the melt channel increases in width are substantially greater in the upstream zone than in the downstream zone.

BRIEF DESCRIPTION OF THE DRAWINGS

The character of the invention, however, may be best understood by reference to one of its structural forms, as illustrated by the accompanying drawings, in which:

FIG. 1 is a side elevational view of the extruder screw of the present invention, FIG. 2 is a fragmentary elevational view on an enlarged scale of the melting section of the screw shown in FIG. 1, FIG. 5 is a fragmentary elevational view of the melting section of a modified screw, and FIG. 6 is a diagrammatic view similar to FIG. 4 for the modified screw shown in FIG. 5.

DETAILED DESCRIPTION OF THE PREFERRED EMBODIMENT

Figure 3:
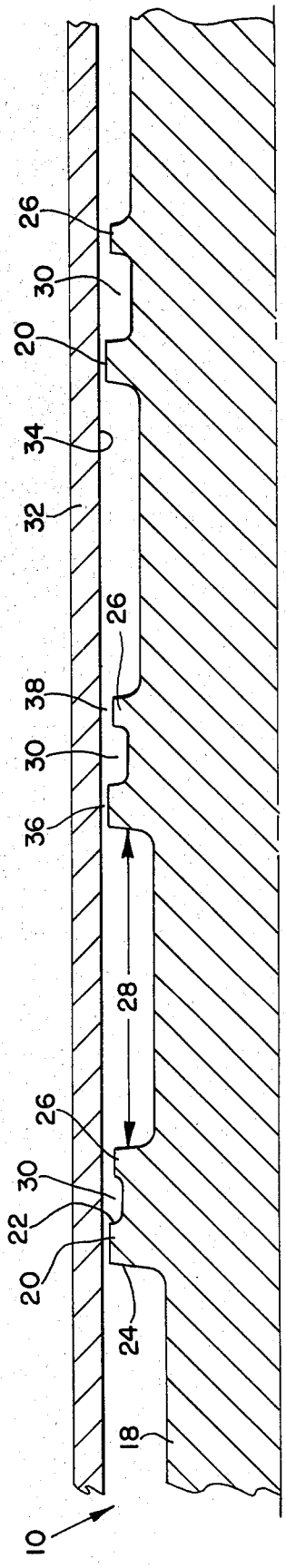
FIG. 3 is a longitudinal, fragmentary sectional view of a portion of the screw extending between dot and dash lines III—III in FIG. 1.

Referring particularly to FIG. 1, the screw of the present invention is generally indicated by the reference numeral 10 and is divided into a feed section 12 adjacent the inlet end 13 of the screw, a metering section 16 adjacent the outlet end 15 and a melting section 14 extending between the feed and metering sections.

Referring to FIGS. 1 and 2, screw 10 comprises a root 18 and a primary flight 20 extending helically about the root. Primary flight 20 has a leading edge 22 and a trailing edge 24. A helical barrier flight 26 is also located on root 18 in the melting section 14 and forms with the primary flight a solids channel 28 and a melt channel 30. Solids channel 28 is formed between the barrier flight and trailing edge 24 and melt channel 30 is formed between the barrier flight and the leading edge 22 of the primary flight. As shown in FIG. 3, the outside diameter of the barrier flight is less than that of the primary flight. Also, the primary flight may be substantially thicker than the barrier flight. The primary flight is dimensioned so that when the screw is placed in the extruder barrel, indicated at 32, there is sufficient clearance between the inner surface 34 of the extruder barrel and the outer periphery of the primary flight to enable the screw to rotate within the barrel without interference. This clearance is indicated by the reference numeral 36. However, since the diameter of the barrier flight is less, a gap 38 that is larger than clearance 36 is formed between the surface 34 of the barrel and the outer periphery of the barrier flight. Gap 38 allows molten thermoplastic material to pass from the solids channel 28 into the melt channel 30 in a manner to be described hereinbelow.

Figure 4:
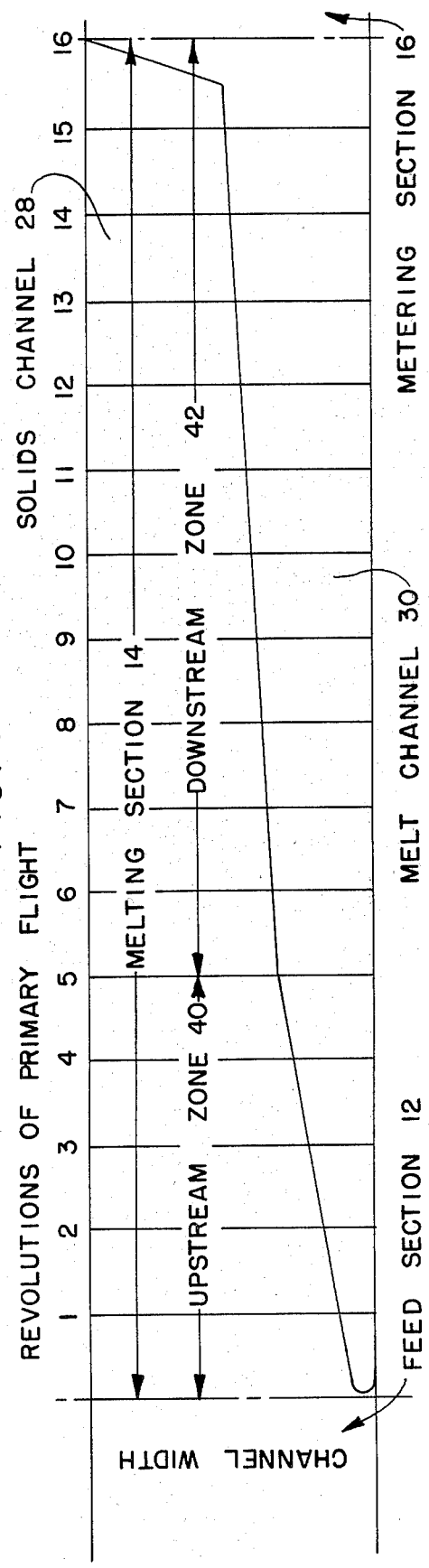
FIG. 4 is a diagrammatic view showing the width of the solids and melt channels plotted in a single plane.

The melting section 14 is divided into two zones, an upstream zone 40 and a downstream zone 42. The pitch of the primary flight 20 remains the same throughout the melting section. The pitch of the barrier flight in the upstream zone is greater than the pitch of the primary flight, so that the width of the solids channel becomes progressively narrower and the width of the melt channel becomes progressively wider in a downstream direction. The change in width of the solids channel 28 and melt channel 30 is shown graphically in FIG. 4, wherein the widths of the channels are greatly exaggerated with respect to their lengths to accentuate the changes in width. However, the pitch of the barrier flight in the downstream zone is substantially less than in the upstream zone. This means that the rate at which the width of the solids channel decreases and the rate at which the width of the melt channel increases is substantially greater in the upstream zone 40 than in the downstream zone 42.

As shown in FIGS. 1-3, the depth of the solids channel 28 gradually diminishes and the depth of the melt channel 30 gradually increases in a downstream direction throughout the melting section. This change can be seen more clearly in FIG. 3 which shows a small portion of the melting section on an enlarged scale. Although the specific dimensions of the various elements comprising the screw of the present invention vary in accordance with the specific extruder applications, the following is an example of a screw for a 2.5 inch extruder made in accordance with the present invention. The screw has a melting section of 40 inches. The lead of the primary flight is 2.5 inches for the entire melting section. The lead of the barrier flight is 2.589 inches in the upstream zone which comprises five complete revolutions of the primary flight. The lead of the barrier flight is 2.534 inches in the downstream zone 42 which comprises ten and one-half revolutions of the primary flight. The melt channel is 2.5 inches in width at its beginning. The solids channel decreases in depth from 0.450 inches to 0.022 inches in the melting section. The melt channel increases in depth from 0.100 inches to 0.400 inches. The barrier flight is undercut 0.022 inches below the height of the primary flight to provide gap 38.

The operation and advantages of the present invention will now be readily understood in view of the above description. When the extruder screw 10 of the present invention is installed as part of a thermoplastic extruder, it is mounted for rotation within an extruder barrel such as 32 shown in FIG. 3. Solid thermoplastic material in the form of pellets or chips and referred to as solids are introduced into the barrel 32 from a suitable hopper. The solids are conveyed along the solids channel 28 by flight 20 in the feed section 12 where they are heated to a temperature which is sufficient to begin the melting process just before they enter the melting section.

As the solids enter the melting section from the feed section they continue to be heated and melting continues to occur along the surface 34 of the barrel. As melting increases, the melt passes through gaps 38 from the solids channel 28 to the melt channel 30. The volume of the solids channel gradually decreases and the volume of the melt channel gradually increases in a downstream direction of the melting section to accommodate the decrease in solids mass and the increase in melt mass. This volume change can be seen more clearly in FIGS. 3 and 4. The change in volume is accomplished by increasing the width and depth of the melt channel while decreasing the width and depth of the solids channel. The change in volume of the channels is sufficient to accommodate the conversion of the thermoplastic material from the solid to the molten state. However, the rate at which the width of the solids channel and melt channel changes varies, as shown graphically in FIG. 4. In the upstream zone 40, the rate of width change is relatively large compared to the downstream zone 42 since there is a greater rate of melting of thermoplastic material in this area than in the downstream zone due to the area of contact between the solids and the barrel afforded by the wide solids channel.

It can be seen, therefore, that the screw of the present invention provides optimum contact between the solids and barrel throughout the melting section by varying the rate of change in the width of the solids and melt channels in accordance with the melting rate of thermoplastic material in the screw. The melting rate is a factor of the thermo-dynamics of the extruder and the type of thermoplastic material being extruded. The change in volume of each of the channels nearly matches the actual conversion of the thermoplastic material from the solid state to the molten state. This enables the solids channel to remain relatively wide throughout the melting section and maintain a high melting efficiency right up to the end of the melting section while also avoiding the condition of having an objectionably deep melt channel at the end of the melting section. The width-to-depth ratio of the melt channel at the end of the melting section is within an acceptable range that insures adequate in-channel circulation and so prevents the possibility of decomposition when extruding thermally unstable materials.

MODIFICATION

Referring particularly to FIGS. 5 and 6, the modified screw of the present invention is generally indicated by the reference numeral 10' and is divided into a feed section 12', a metering section 16' and a melting section 14' extending between the feed and metering sections. Screw 10' comprises a root 18' and a primary flight 20' extending helically about the core. Primary flight 20' has a leading edge 22' and a trailing edge 24'. A helical barrier flight 26' is also located about root 18' in the melting section 14' and forms with the primary flight a solids channel 28' and a melt channel 30'. Solids channel 28' is formed between the barrier flight and trailing edge 24' and melt channel 30' is formed between the barrier flight and the leading edge 22' of the primary flight.

The melting section 14' is divided into two zones, an upstream zone 40' and a downstream 42'. The pitch of the primary flight 20' remains the same throughout the melting section. However, the pitch of the barrier flight in the upstream zone is greater than the pitch of the primary flight, so that the width of the solids channel becomes progressively narrower and the width of the melt channel becomes progressively wider in a downstream direction. The pitch of the barrier flight is slightly greater than the pitch of the primary flight in the downstream zone 42', so that there is a gradual decrease in the width of the solids channel and a gradual increase in the width of the melt channel in the downstream zone. However, the pitch of the barrier flight in the downstream zone is substantially less than in the upstream zone.

The upstream zone 40' is divided into an upstream portion 44 and a downstream portion 46. The pitch of the barrier flight in the upstream portion 44 is greater than in the downstream portion 46. However, both are greater than the pitch of the barrier flight in downstream zone 42'. This means that the width of the solids channel decreases and the width of the melt channel increases to a substantial degree in the upstream portion 44 of the upstream zone 40' and to a lesser degree in the downstream portion 46 of the upstream zone 40', as shown in FIG. 6. The decrease in the width of the solids channel and the increase in width of the melt channel in the downstream zone 42' occurs to a lesser degree than in the downstream portion 46.

As in the preferred embodiment, the depth of the solids channel 28' gradually diminishes and the depth of the melt channel 30' gradually increases in a downstream direction throughout the melting section. An example of a screw for a 2.5 inch extruder, made in accordance with the modification is shown in FIGS. 5 and 6 and has the following dimensions. The screw has a melting section of forty inches. The lead of the primary flight is 3.5 inches for the entire melting section. The lead of the barrier flight is 3.735 inches in the upstream portion 44 which comprises three complete revolutions of the primary flight. The lead of the barrier flight is 3.570 inches in the downstream portion 46 which comprises three complete revolutions of the primary flight. The lead of the barrier flight is 3.563 inches in the downstream zone 42' which comprises five complete revolutions of the primary flight. The melt channel is 0.312 inches in width at its beginning in the upstream portion. The solids channel decreases in depth from 0.350 inches to 0.020 inches in the melting section. The melt channel increases in depth from 0.050 inches to 0.300 inches in the melting section.

The modified screw 10' is similar to the preferred screw 10 in that the channel widths change at a greater rate in the upstream zone than in the downstream zone to accommodate the greater amount of melting that occurs in the upstream zone. However, the upstream zone is divided into two portions having different rates of change in the channel widths to accommodate a specific extruder condition in which the thermoplastic material melts to a greater degree in the upstream portion of the upstream zone than in the downstream portion.

The invention having been thus described, what is claimed as new and desired to secure by Letters Patent is:

1. An extruder screw having an inlet end and an outlet end comprising:
   (a) a root,
   (b) a helical primary flight extending about the root having a trailing edge and a leading edge, said flight and said root defining a feed section at the inlet end of the screw, a metering section at the outlet end of the screw and a melting section between the feed section and the metering section, and
   (c) a helical barrier flight on the root forming a solids channel with the trailing edge of the primary flight and a melt channel with the leading edge of the primary flight, the width of the solids channel gradually decreasing and the width of the melt channel gradually increasing in a downstream direction, said melting section being divided into at least two lengthwise zones, wherein the change in width of each of said channels is at a first constant rate in one of the zones and a second constant rate in the other of the zones, said rates being in accordance with the melting characteristics of the thermoplastic material in the screw.

2. An extruder screw as set forth in claim 1, wherein one of said zones is a downstream zone and the other zone is an upstream zone, the rate of change in the widths of said channels being substantially less in the downstream zone than in the upstream zone.

3. An extruder screw as recited in claim 2, wherein said upstream zone is divided into an upstream portion and a downstream portion, the rate of change in the width of each of said channels being substantially greater in said upstream portion than in said downstream portion.

4. An extruder screw as set forth in claim 1, wherein the pitch of the primary flight is constant and the pitch of the barrier flight is varied.

5. An extruder screw as set forth in claim 1, wherein the outer diameter of the primary flight is greater than the outer diameter of the barrier flight.

6. An extruder screw as set forth in claim 1, wherein the depth of the solids channel gradually decreases and the depth of the melt channel gradually increases along the melting section in a downstream direction.

7. An extruder screw as set forth in claim 6, wherein the outer diameters of the primary and barrier flights are constant along the melting section and wherein the outer diameter of the root in a downstream direction, gradually increases along the solids channel and gradually decreases along the melt channel.

* * * * *